Figure 1:
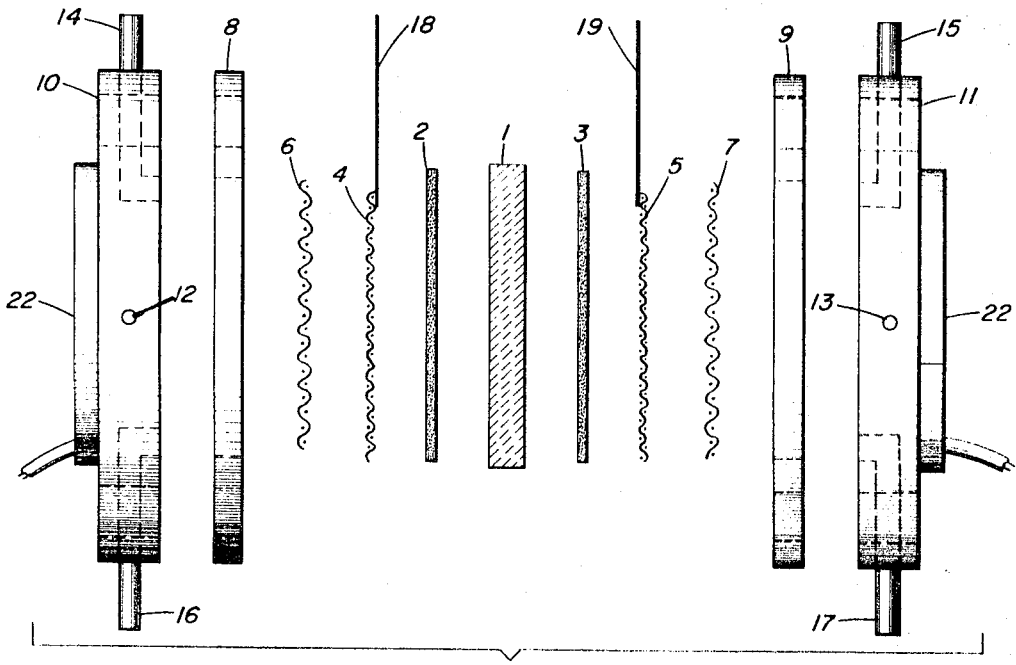

July 22, 1969     S. ARCANO ETAL     3,457,116

METHOD FOR CHEMICALLY REDUCING NOBLE METAL COMPOUNDS

Filed April 12, 1966

INVENTORS.
STEPHEN ARCANO
WILLIAM AUSTIN BARBER

BY *Henry N. Kline*

ATTORNEY

# United States Patent Office 3,457,116
Patented July 22, 1969

3,457,116
METHOD FOR CHEMICALLY REDUCING
NOBEL METAL COMPOUNDS
Stephen Arcano and William Austin Barber, Stamford,
Conn., assignors to American Cyanamid Company,
Stamford, Conn., a corporation of Maine
Filed Apr. 12, 1966, Ser. No. 542,012
Int. Cl. H01m 27/10
U.S. Cl. 136—120          10 Claims The present invention relates to a novel method for preparing catalytic electrodes eminently suitable for use in a variety of fuel cells, such as hydrogen-air, hydrogen-oxygen, hydrazine-oxygen, hydrocarbon-oxygen and ammonia-oxygen fuel cells. More particularly, the invention is concerned with a novel method for reducing noble metal compounds which are incorporated in the reduced state into an electrode structure. Still more particularly, the invention is concerned with the preparation of an electrode comprising as the catalytic component thereof a reduced noble metal having a crystallite size averaging between about 20 A. and about 35 A.

In a copending application for Letters Patent, Ser. No. 511,075, now abandoned, filed by William A. Barber on Dec. 2, 1965, there is disclosed a novel procedure for preparing a catalytic electrode suitable for use in a fuel cell. It is there stated that the reduction of a noble metal compound, such as cholorplatinic acid or rhodium chloride, by means of a substituted silane in an alcoholic solvent yields an active noble metal which has a crystallite size of 35 A. or even smaller. This crystallite size is singularly important for the principal reason that enhanced performance is obtained when utilizing the reduced noble metal employing the process therein described.

It is also known that alkali metal borohydride reduction of noble metal compounds results in the reduced compound. The crystallite size of the latter usually is in excess of 65 A. Such a reduction procedure is not wholly satisfactory for the reason that the so-prepared noble metal, when incorporated into an electrode structure utilized in a cell, does not enhance the latter's performance. Hence, it is desirable to perfect the reduction technique so that a noble metal compound, when reduced to its elemental state, is of such crystallite size that incorporation into an electrode structure will markedly contribute to the overall enhanced performance of a fuel cell. As stated in the aforementioned identified application, continued efforts involving both time and money have been expended to perfect electrodes containing at least one noble metal catalyst present in a physical form which will contribute substantially to the performance of an electrode.

It has been unexpectedly found that a noble metal compound can be reduced in a simple and straightforward manner, The method employed would be inexpensive and readily available involving the reduction of a nobel metal compound, such as choloroplatinic acid, rhodium chloride, ruthenium chloride or mixtures thereof, as well as their corresponding bromo or iodo derivatives, in a selective alcoholic solvent containing at least three moles of an alkali metal hydroxide per mole of the noble metal compound being reduced. The reduction takes place at temperatures ranging from between about 20° C. and about 100° C. Advantageously, a conductive filler, such as graphite, or carbons recovered from calcium cyanamide production or any desired pulverized metal compound, such as, for instance, nickel or tantalum metal powder, tungsten carbide or titanium carbide, can be present during the reaction. If present, the particles of noble metal which form as soon as reduction occurs will precipitate on or coat the conductive filler.

The alcohol employed in the process of the invention is one which contains at least two carbon atoms and in which the alkali metal hydroxide is at least partially soluble. Illustrative alcoholic solvents are: ethyl alcohol, n-propyl alcohol, n-butyl alcohol, ethylene glycol and glycerol.

The alkali metal hydroxide which falls within the purview of the present invention may be either sodium hydroxide or, preferably, potassium hydroxide. Potassium hydroxide is preferred, for the reason that it is more soluble in the alcoholic solvents employed. Alternatively, lithium hydroxide can be employed. It is found that lithium hydroxide is relatively insoluble in any of the above enumerated alcohols.

In general, a 3-fold molar excess of alkali metal hydroxide with respect to the noble metal compound being reduced is employed. However, as much as a 100-fold molar excess can be tolerated.

To determine the crystallite size of noble metals as prepared in accordance with the process of the invention, known X-ray techniques are employed. It is found that the crystallite size of the noble metals so prepared varies from about 20 A. to about 35 A. and that where reducing agents, such as sodium borohydride, are employed, the crystallite size measured by the same X-ray technique usually is in excess of 65 A.

The reduced noble metal catalyst which preferably coats a conductive filler is further treated by adding thereto a binder-waterproofing agent in an aqueous emulsion form comprising, for example, waterproofing compounds, such as polytetrafluoroethylene or polyethylene. Upon the addition of the latter, a spreadable paste is obtained which is then spread on a suitable screen or grid. This grid can be stanless steel, tantalum, nickel, asbestos or acrylic paper. Alternatively, the paste can be spread on a suitable surface. Such surface may, for instance, be glass or mylar polyesters which are then dried. Upon drying, there is formed a stripable sheet which can be removed from the applied surface.

The sheet or grid as hereinabove prepared can be cut to any desired size and shape for use in a fuel cell. As is known, there is employed in such a cell a matrix or membrane which separates electrodes, at least one of which is prepared in accordance with the process of the invention.

The matrix component of the fuel cell is saturated with either base or acid electrolyte. Ordinary filter paper, asbestos fiber paper as well as polymeric membranes containing commercially available ion exchange materials can be used. The latter material may also be used in either a leached or water-equilibrated state. For illustrative purposes, ordinary filter paper which is saturated with either 5 N or 8 N potassium hydroxide can be employed herein as the matrix or electrode-separating membrane.

In general, one preferred hereinbelow defined fuel cell which falls within the purview of the present invention comprises three essential elements: base electrolyte, electrodes or electrocatalysts, one of which comprises the electrode of the present invention, and current collectors. Suitable collectors can be perforated, or corrugated plates or metallic screens and equivalents thereof.

In order to further clarify the invention, these and other embodiments thereof are shown in the accompanying drawing and will be described in detail in conjunction with said drawing.

Figure 2:
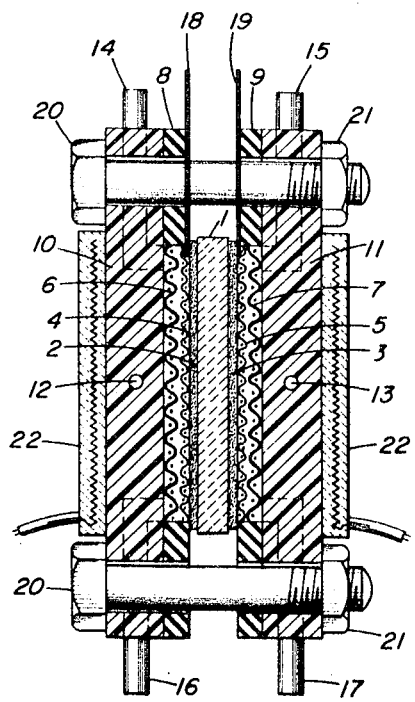

In the drawing:

FIGURE 1 is an exploded plan view, partially in section, of a fuel cell employing the electrode of the present invention, and FIGURE 2 is a partially expanded side view, partially in section, of the fuel cell of FIGURE 1.

In FIGURE 1, a 5 N potassium hydroxide saturated filter paper membrane 1, is positioned between a fuel electrode 2 of the invention and an oxygen electrode 3, such as platinum, palladium or silver. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants Exterior to the gaskets are housing members 10 and 11 to which are attached thermocouple 12 and heat control probe 13 and having inlet stainless steel or other inert metal tubing 14 and 15 through which hydrogen and oxygen are separately introduced into the fuel cell. Stainless steel tubing 16 and 17 are provided as vents for unused gases. Wire leads 18 and 19, connected to current collector screens 4 and 5, are the conductive members through which current flows from and to the fuel cell through the external circuit when the fuel cell is in operation. The cell, secured by means of bolts 20 and nuts 21 as shown in FIGURE 2, can be heated, if desired, by an external electrical heating pad 22. The temperature of the cell, determined by the thermocouple 12, is controlled by heat control probe 13.

Illustrative examples which are not to be taken as limitative of the invention are presented below. These examples will illustrate the novel reduction technique of the invention as well as the incorporation of reduced noble metal compounds in an electrode structure for purposes of enhancing the performance of a fuel cell. Further, each of the examples incorporates the fuel cell as defined by the above drawing. Unless otherwise stated, the parts are by weight.

EXAMPLE 1

To 500 parts of a 15% potassium hydroxide solution in ethyl alcohol are added 12 parts of chloroplatinic acid. The mixture is stirred to effect dissolution of the choloplatinic acid. Resultant mixture is heated to 80° C. with vigorous stirring. Reduction is completed within about one hour, while maintaining the temperature at between 80° C.–84° C. Metallic platinum is obtained as a black fluffy powder which is filtered, washed thoroughly with ethyl alcohol and finally dried.

An electrode sheet is prepared by admixing the resultant platinum black powder with a 60% polytetrafluoroethylene aqueous emulsion. The mixture is spread on a 100 mesh nickel screen whereby an electrode containing 10 milligrams of platinum per square centimeter of electrode area is obtained.

Upon X-ray analysis, it is found that the crystallite size of the platinum compound ranges between 30 A. and 35 A.

A one-inch disc is cut from the electrode sheet as prepared above and tested as a hydrogen electrode in a hydrogen-oxygen fuel cell at 70° C. utilizing an oxygen electrode prepared from commercial platinum black. There is produced at the latter temperature 0.82 volt at 200 milliameters per square centimeter.

EXAMPLE 2

Following the procedure of Example 1 in every detail except that 9 parts of graphite are added to the 15% KOH solution in ethanol. To the mixture are added 2.5 parts of chloroplatinic acid in ethanol. Resultant reduced reaction product is subsequently filtered, washed and dried as in Example 1 to yield a black powder, namely, platinum, precipitated on graphite. An electrode sheet is next made by admixing the latter platinized graphite with the binder-waterproofing agent as in Example 1 whereby an electrode is formed containing 1.0 mg. Pt/cm². Finally, the electrode which is cut from this disc is tested as in Example 1 with attendant good performance.

EXAMPLE 3

The procedure of Example 2 is followed in every detail, except that 1.25 parts of rhodium chloride is substituted for half of the chloroplatinic acid originally tested.

Resultant electrode is found to contain 0.5 mg. Pt+0.5 mg. Rh/cm². The electrode's performance is tested as in Example 1 and is found to be good.

EXAMPLE 4

The procedure of Example 1 is followed in every detail, except that 1.25 parts of ruthenium chloride are substituted for an equal part of the chloroplatinic acid to yield a final mixed noble metal (i.e., Pt:Ru) of 19:1.

Performance of such a catalyst when tested as in Example 1 is highly satisfactory.

EXAMPLE 5

Following the procedure of Example 1 except that 500 parts of a 5% solution of potassium hydroxide are used. The reaction proceeds as in Example 1 and the results are substantially the same.

We claim:

1. In a process for preparing a reduced noble metal electrode adapted for use in an electrode structure to be used in a fuel cell, the improvement which consisted essentially in: chemically reducing at a temperature between about 20° C. and 100° C. an overall mixture comprising (a) an alcoholic solvent having at least two carbon atoms, (b) a noble metal compound soluble in said alcoholic solvent and containing at least one element selected from the group consisting of platinum, rhodium, ruthenium and mixtures thereof and (c) an alcoholic-soluble alkali metal hydroxide, said hydroxide being present in the overall mixture in an amount equal to at least three moles of alkali metal hydroxide per mole of the noble metal compound whereby at said temperature a reduced noble metal is formed having a crystallite size ranging from between about 20 A. and 35 A.

2. The process according to claim 1 wherein there is added to the overall mixture an electrically conductive filler whereby resultant reduced noble metal having a crystallite size ranging from between about 20 A. and 35 A. precipitates on said conductive filler.

3. The process according to claim 1 wherein the reduction is carried out in the presence of ethanol.

4. The process according to claim 1 wherein the reduction is carried out in the presence of n-propanol.

5. The process according to claim 1 wherein the noble metal compound prior to reduction comprises chloroplatinic acid.

6. The process according to claim 1 wherein the noble metal compound prior to reduction comprises a mixture of chloroplatinic acid and rhodium chloride.

7. The process according to claim 1 wherein the noble metal compound prior to reduction comprises rhodium chloride.

8. The process according to claim 1 wherein the noble metal compound prior to reduction comprises ruthenium chloride.

9. The process according to claim 1 wherein the alkali metal hydroxide is potassium hydroxide.

10. The process according to claim 1 wherein the alkali metal hydroxide is sodium hydroxide.

References Cited

UNITED STATES PATENTS

| | | | |
|---|---|---|---|
| 3,098,762 | 7/1963 | Roblee et al. | 117—228 |
| 3,291,753 | 12/1966 | Thompson | 252—447 |

WINSTON A. DOUGLAS, Primary Examiner

A. SKAPARS, Assistant Examiner

U.S. Cl. X.R.

75—108; 136—86